United States Patent
Rittenhouse et al.

(10) Patent No.: US 10,819,512 B2
(45) Date of Patent: Oct. 27, 2020

(54) MULTIPLE TRANSCEIVERS FOR WIRELESS KEY UPDATE

(71) Applicant: Simmonds Precision Products, Inc., Vergennes, VT (US)

(72) Inventors: Garret Edward Rittenhouse, Burlington, VT (US); Radoslaw Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 213 days.

(21) Appl. No.: 15/814,886

(22) Filed: Nov. 16, 2017

(65) Prior Publication Data

US 2019/0149330 A1    May 16, 2019

(51) Int. Cl.
*H04L 9/08* (2006.01)
*H04L 29/06* (2006.01)
*H04L 9/14* (2006.01)
*H04W 12/04* (2009.01)

(52) U.S. Cl.
CPC .......... *H04L 9/0891* (2013.01); *H04L 9/083* (2013.01); *H04L 9/14* (2013.01); *H04L 63/0428* (2013.01); *H04W 12/04033* (2019.01); *H04L 9/0822* (2013.01); *H04L 9/0827* (2013.01); *H04L 63/068* (2013.01); *H04L 2209/80* (2013.01)

(58) Field of Classification Search
CPC ... H04L 9/0891; H04L 9/083; H04L 63/0428; H04L 9/14; H04L 2209/80; H04L 9/0822; H04L 9/0827; H04L 63/068; H04W 12/04033

USPC .......................................................... 380/279
See application file for complete search history.

(56) References Cited

U.S. PATENT DOCUMENTS

| 8,712,044 B2 | 4/2014 | MacMillan et al. |
| 9,226,142 B2 | 12/2015 | Fukuda |
| 2005/0282521 A1 | 12/2005 | Hermann et al. |
| 2006/0133614 A1 | 6/2006 | Zhang et al. |

(Continued)

FOREIGN PATENT DOCUMENTS

| EP | 2731292 A1 | 5/2014 |
| GB | 2411086 A | 8/2005 |

OTHER PUBLICATIONS

Extended European Search Report for EP Application No. 18206705.8, dated Feb. 5, 2019, pp. 9.

(Continued)

*Primary Examiner* — Mohammad W Reza
(74) *Attorney, Agent, or Firm* — Kinney & Lange, P. A.

(57) ABSTRACT

A wireless communication system and method includes a first wireless node and a data concentrator configured to provide a new encryption key updated from a current encryption key to the first wireless node. The data concentrator includes first and second transceivers. The data concentrator provides a key update message that includes the new encryption key to the first wireless node via the first transceiver. The key update message is encrypted using the current encryption key. The data concentrator is configured to decrypt first transmissions from the first wireless node via the second transceiver using the new encryption key, and decrypt the first transmissions via the first transceiver using the current encryption key.

10 Claims, 3 Drawing Sheets

(56) References Cited

U.S. PATENT DOCUMENTS

| | | | | |
|---|---|---|---|---|
| 2008/0170690 A1* | 7/2008 | Tysowski | .......... | H04W 12/0013 |
| | | | | 380/270 |
| 2010/0322427 A1 | 12/2010 | Smaak | | |
| 2011/0067096 A1* | 3/2011 | Chakarapani | ....... | H04L 41/0806 |
| | | | | 726/14 |
| 2014/0208115 A1* | 7/2014 | Fukada | ................ | H04L 9/0891 |
| | | | | 713/171 |
| 2016/0021066 A1* | 1/2016 | Parvathaneni | ........ | H04W 12/04 |
| | | | | 713/171 |

OTHER PUBLICATIONS

Communication Pursuant to Article 94(3) EPC for EP Application No. 18206705.8, dated Dec. 17, 2019, pp. 4.

\* cited by examiner

MULTIPLE TRANSCEIVERS FOR WIRELESS KEY UPDATE

BACKGROUND

The present invention relates generally to wireless encryption, and in particular to a system and method for wireless encryption key update.

Wireless networks that include nodes, such as sensor networks and actuator networks often encrypt data for wireless communication between the nodes and a data concentrator, for example. In order to ensure that the wireless network remains secure, it is necessary to periodically update encryption keys for all nodes on the wireless network.

The available computing resources in these wireless networks are typically highly asymmetric. For example, a data concentrator or other access point may include a wired connection and be capable of energy-demanding data processing, while the wireless nodes may be battery-powered and configured to conserve energy. Uncertainty in data transmission is also an issue with wireless networks. For example, encryption key updates may fail due to some of the relevant transmission from the data concentrator not being received by the node due to random interference or due to temporary deterioration of radio-frequency (RF) propagation, for example. Thus, it is desirable to implement a system and method that increases the probability that each node on the network is able to receive encryption key updates from the data concentrator, while also requiring minimal data processing at the wireless nodes.

SUMMARY

In an example embodiment, a method of wireless communication includes updating a first encryption key to a second encryption key; communicating, via a first transceiver, the second encryption key to a first wireless node; decrypting first data transmissions received from the first wireless node via the first transceiver using the first encryption key; and decrypting the first data transmissions received from the first wireless node via a second transceiver using the second encryption key.

In another example embodiment, a wireless communication system includes a first wireless node and a data concentrator configured to provide a new encryption key updated from a current encryption key to the first wireless node. The data concentrator includes first and second transceivers. The data concentrator provides a key update message that includes the new encryption key to the first wireless node via the first transceiver. The key update message is encrypted using the current encryption key. The data concentrator is configured to decrypt first transmissions from the first wireless node via the second transceiver using the new encryption key, and decrypt the first transmissions via the first transceiver using the current encryption key.

In another example embodiment, a method of wireless communication between a data concentrator and a plurality of wireless nodes includes encrypting a key update command using a current encryption key, wherein the key update command includes a new encryption key; transmitting, via a first transceiver, the key update command to the plurality of wireless nodes; decrypting, via the first transceiver, messages from the plurality of wireless nodes using the current encryption key; and decrypting, via a second transceiver, messages from the plurality of wireless nodes using the new encryption key.

DETAILED DESCRIPTION

A wireless network is disclosed herein that includes a data concentrator having two transceivers for wireless data communication with wireless nodes. At least some data communication in the wireless network is encrypted. The data concentrator may designate one of the transceivers as a primary transceiver and the other as a secondary transceiver. When updating an encryption key, the new key is encrypted in a message using the current key and is sent to the wireless nodes from the data concentrator via the secondary transceiver. Until all of the wireless nodes have successfully updated to the new key, the secondary transceiver continues attempting to decrypt messages from the wireless nodes using the current key.

During and after the key update, the data concentrator communicates with the wireless nodes via the primary transceiver using the new encryption key. Thus, acknowledgements and other messages from the wireless nodes that have been encrypted with the new key may be received and processed through the primary transceiver. This way, the data concentrator knows when each of the wireless nodes have successfully updated to the new key. For any nodes that continue to communicate using the current key, the secondary transceiver may re-send the new key in a message encrypted with the current key. Once the data concentrator has verified that all wireless nodes have successfully updated to the new key, the secondary transceiver may be used for monitoring and support purposes.

Figure 1A:
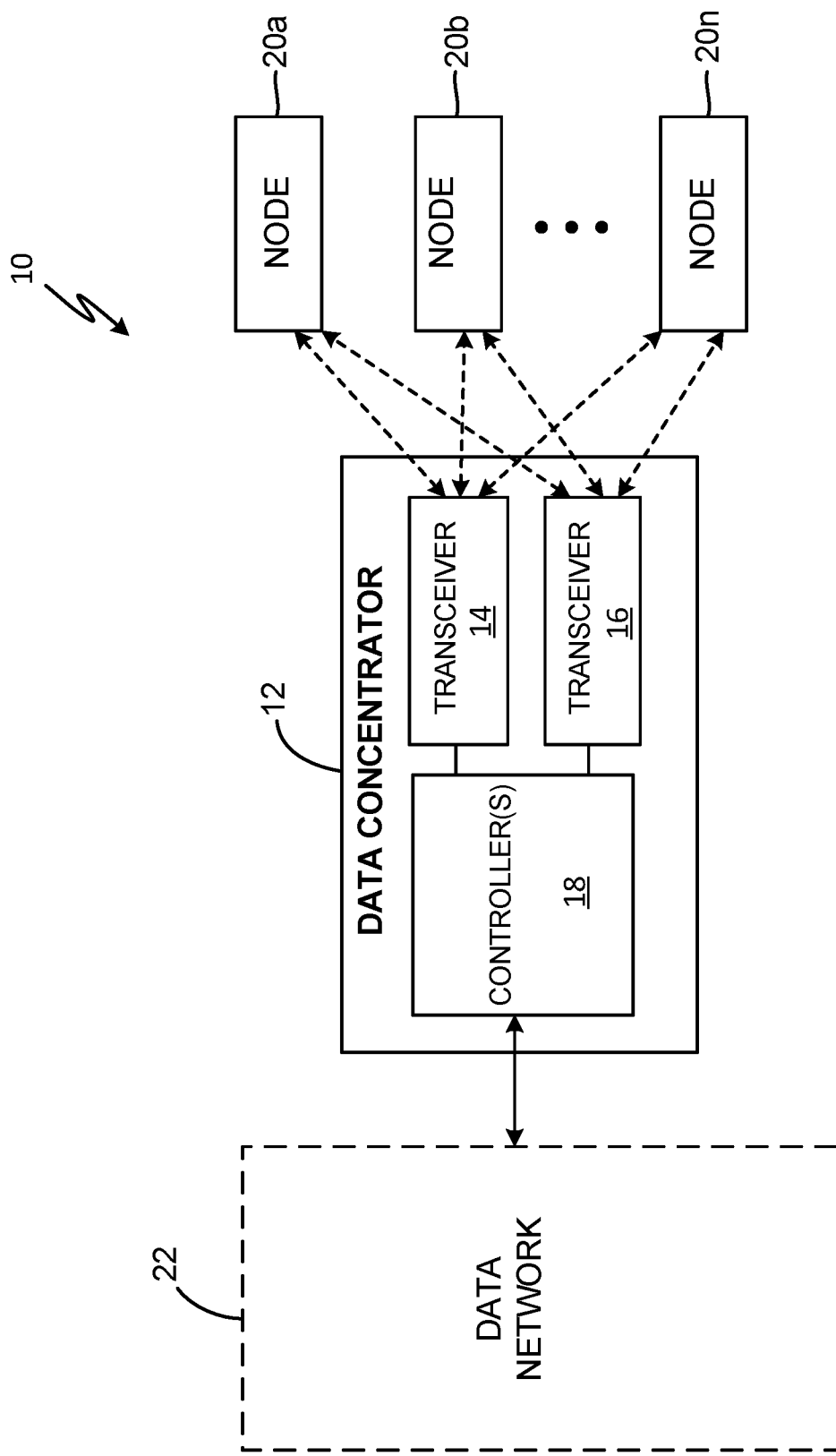
FIG. 1A is a block diagram illustrating a wireless communication system that includes a data concentrator having two transceivers.

FIG. 1A is a block diagram illustrating wireless communication system 10 that includes data concentrator 12. Data concentrator 12 includes first transceiver 14, second transceiver 16, and controller(s) 18. Data concentrator 12 is configured to communicate wirelessly with nodes 20a-20n using transceivers 14 and 16. Data concentrator 12 is also configured to communicate with data network 22 using wired or wireless communication. Data network 22, for example, may include a wired data communication bus, a wired power bus, or both. In an embodiment, system 10 may be implemented onboard an aircraft. In this embodiment, the wired power bus may be a 28V aircraft power bus that receives power from one or more generators and the wired data communication bus may be an aircraft data bus that allows data concentrator 12 to communicate with other systems, such as other data concentrators, avionics systems, or any other system connected to the data communication bus.

During normal system operation, data concentrator 12 may communicate with wireless nodes 20a-20n using transceiver 14, for example, which may be designated as the primary transceiver. This communication may be encrypted using a current private encryption key. While primary communication is occurring using transceiver 14, transceiver 16, which may be designated as a secondary transceiver, may be providing monitoring and support for data concentrator 12. For example, the secondary transceiver may monitor the power in the communication channel, or act as a secondary communication channel to verify data integrity.

Periodically, data concentrator 12 will want to update the private encryption key utilized for encrypted communication between data concentrator 12 and wireless nodes 20a-20n. Controller(s) 18 may include one or more microcontrollers, microprocessors, application specific integrated circuits (ASICs), field programmable gate arrays (FPGAs), or any other digital or analog circuitry. Controller(s) 18 may include sufficient computing resources to generate encryption keys that are difficult to predict, for example. In other embodiments, a new encryption key may be provided to data concentrator 12 from a key manager or other system on data network 22, for example.

To initiate a key update for wireless nodes 20a-20n, data concentrator 12 may use transceiver 14, since it has already been communicating using the current encryption key. In this embodiment, transceiver 14 transitions to the secondary transceiver role, while transceiver 16 transitions to the primary transceiver role. In other embodiments, transceivers 14 and 16 may remain the primary and secondary transceivers, respectively. Data concentrator 12 may encrypt a message that includes the new key using the current encryption key. Transceiver 14 may then send the message to each node 20a-20n to update their respective encryption keys. Transceiver 14 will continue to attempt to decrypt messages from each node 20a-20n using the current encryption key. While communicating the key update using transceiver 14, transceiver 16 may begin communicating with each node 20a-20n using the new encryption key.

Data concentrator 12 may verify key updates for each node 20a-20n, for example, by receiving an acknowledgement from the wireless node 20a-20n, or by receiving any communication from wireless node 20a-20n that is encrypted using the new key. Until it is verified that all wireless nodes 20a-20n have updated to the new key, transceiver 14 continues to receive communications and attempt to decrypt the communications using the current key. For example, if data concentrator 12 receives a message from a wireless node 20a that is successfully decrypted via transceiver 14 using the current key, data concentrator 12 may re-send the new key in a message encrypted with the current key to node 20a using transceiver 14.

Following successful key update for each node 20a-20n, data concentrator 12 may resume normal operation using one transceiver for communication with nodes 20a-20n. For example, because transceiver 16 was communicating using the new key during the key update, transceiver 16 may continue as the primary transceiver during normal system operation. When another new key update is required, transceivers 14 and 16 may assume the same role, or may switch roles. For example, when a new key update is required, since transceiver 16 will be communicating with the current key (previous new key), transceiver 16 may be utilized as the secondary transceiver and communicate key updates to each node 20a-20n while transceiver 14 may become the primary transceiver and communicate using the new key.

Figure 1B:
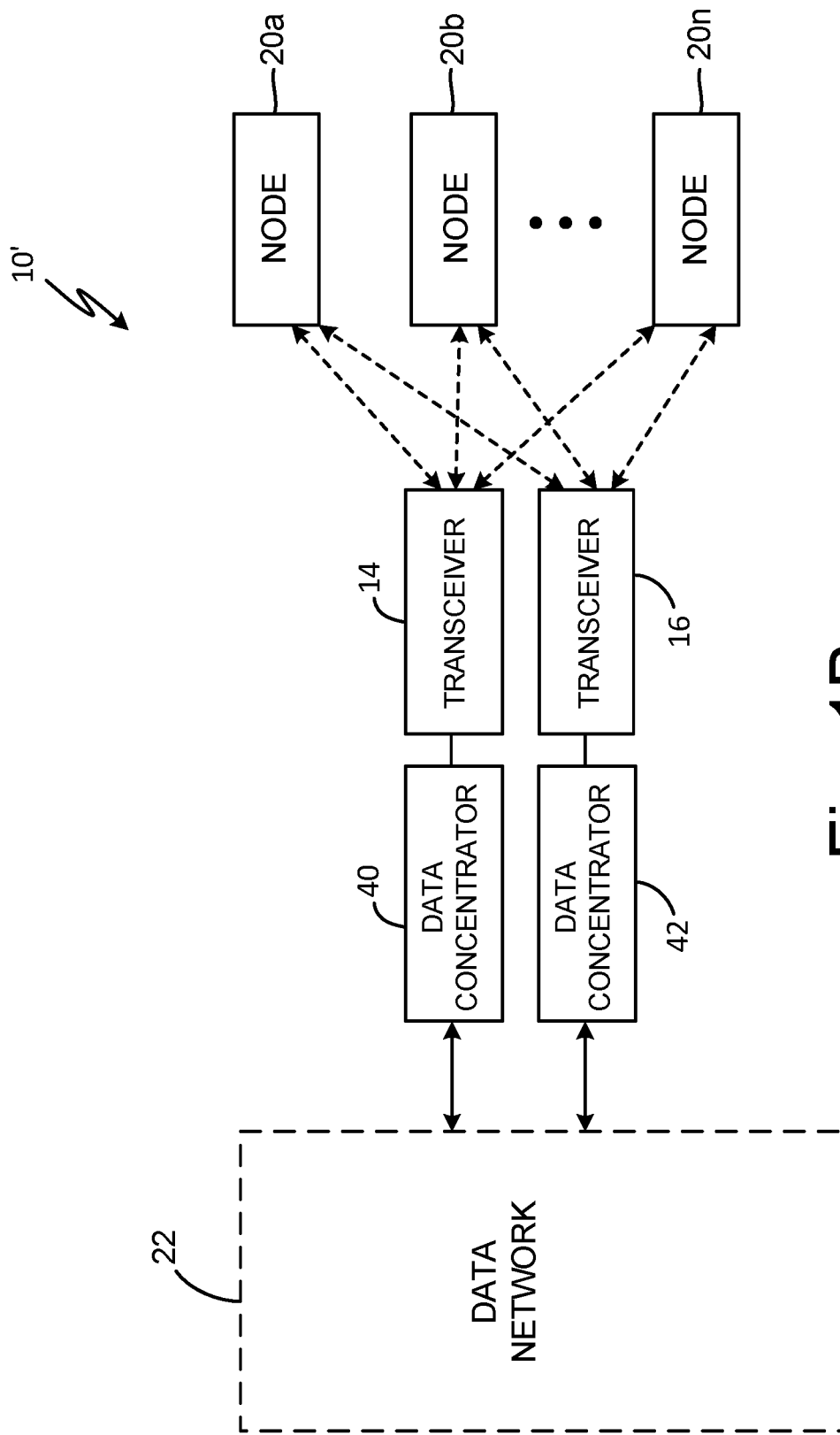
FIG. 1B is a block diagram illustrating a wireless communication system that includes multiple data concentrators each having a single transceiver.

FIG. 1B is a block diagram illustrating wireless communication system 10' that includes two data concentrators 40 and 42. System 10' works in a substantially similar manner to system 10 of FIG. 1A. In system 10', transceiver 14 is included as part of data concentrator 40 while transceiver 16 is included as part of data concentrator 42. In system 10' data concentrators 40 and 42 may be positioned in separate locations. In system 10', one of data concentrators 40 or 42 may be designated as a primary data concentrator and handle generation of new keys, or a new key may be generated by a key manager or other system of data network 22 and provided to data concentrators 40 and 42.

By using two transceivers 14 and 16, systems 10 and 10' are able to handle two common scenarios in which data concentrator 12 receives no response from a wireless node 20a following a key update command. The first scenario being that wireless node 20a never received the key update command from data concentrator 12 due to RF interference or some other reason. In this scenario, the secondary transceiver will receive a subsequent message from wireless node 20a that will still be encrypted using the current key. The secondary transceiver will successfully decrypt that message and know that wireless node 20a has not yet updated to the new key. The secondary transceiver is then able to re-send the new key update command to wireless node 20a. The other scenario is when wireless node 20a has properly received the key update command and updated to the new key, but data concentrator 12 never receives the acknowledgement. In this scenario, wireless node 20a will send subsequent messages encrypted with the new key. The primary transceiver will be able to decrypt these messages using the new key and will know that wireless node 20a successfully updated to the new key even though the original acknowledgement was lost.

Use of two transceivers 14 and 16 to communicate with common nodes 20a-20n may raise some considerations with regard to communication protocols. For example, if transceivers 14 and 16 are using the same radio frequency channel and following a Time Division Multiple Access (TDMA) scheme, then data concentrator 12 must take care to coordinate the time of transmissions from the two transceivers 14 and 16 to ensure that the two transceivers 14 and 16 do not transmit simultaneously so as to avoid collisions.

In another embodiment, a Code Division Multiple Access (CDMA) scheme may be used in which different waveform coding is used by the two transceivers 14 and 16 to communicate with nodes 20a-20n. In the case of CDMA communication, the encryption key update might be used to simultaneously update the code used by nodes 20a-20n to demodulate messages from data concentrator 12. In this embodiment, once a node 20a-20n updates its encryption key and the code used to demodulate received transmissions, it will no longer be able to properly receive messages from the secondary transceiver, which will still be using the old code. This may relax the requirement to synchronize transmissions from the two transceivers 14 and 16.

In yet another embodiment, a Frequency Division Multiple Access (FDMA) scheme may be used, whereby transceivers 14 and 16 operate on different radio frequency channels, thus avoiding interference with each other. In this embodiment, the command to update keys may be simultaneously used to change channels, so that all communications using the primary (new) key occur on one channel, and all communications using the secondary (old) key occur on another channel.

Figure 2:
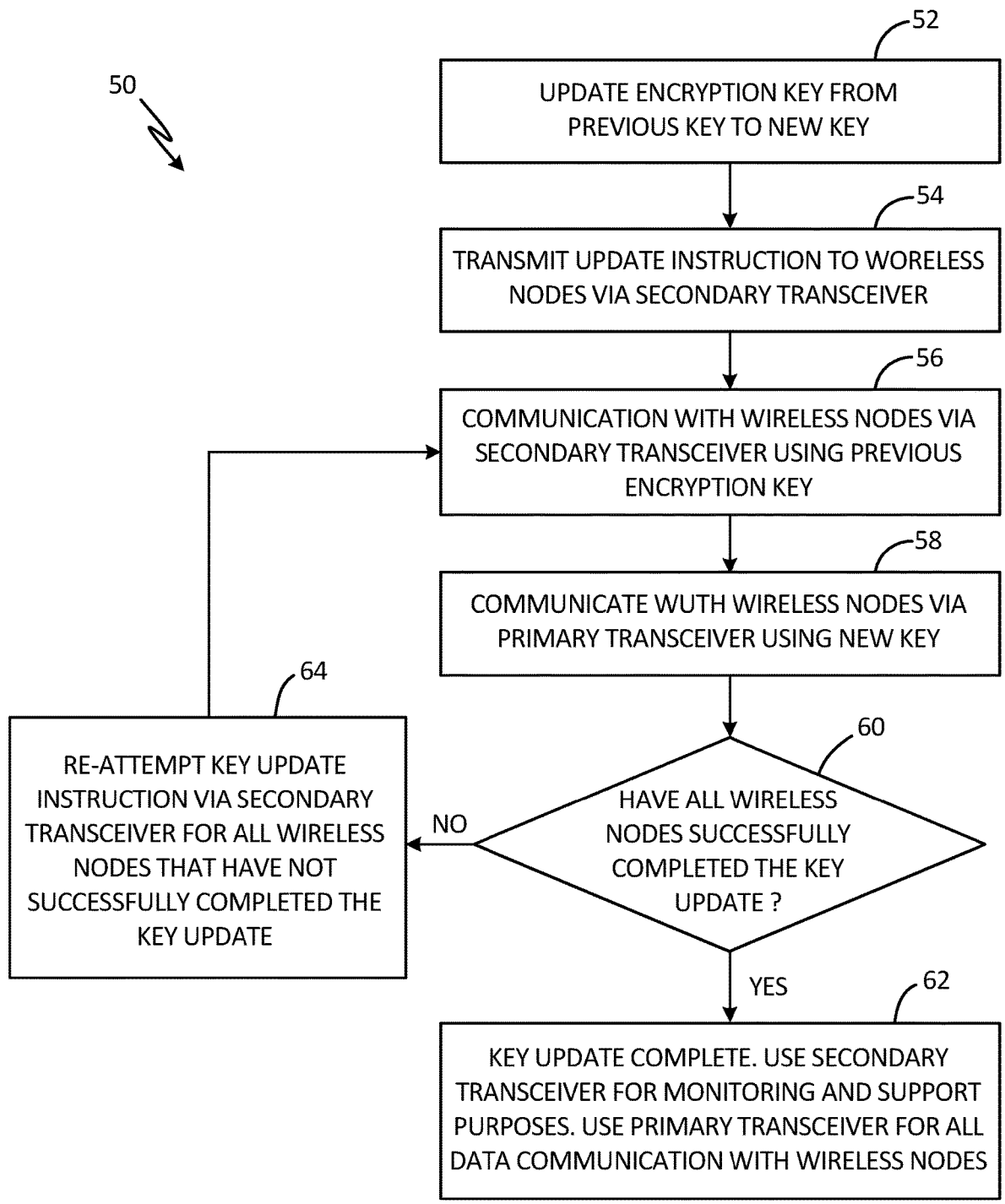
FIG. 2 is a flowchart illustrating a method of updating keys of wireless nodes using a data concentrator.

FIG. 2 is a flowchart illustrating method 50 of updating keys of wireless nodes using a data concentrator. The data concentrator may be data concentrator 12 and the wireless nodes may be nodes 20a-20n (FIG. 1A). At step 52, the data concentrator updates the current encryption key to a new encryption key. At step 54, the data concentrator uses its secondary transceiver to instruct each of the wireless nodes to update their respective encryption keys. The instructions sent by the secondary transceiver are encrypted using the current encryption key. At step 56, the secondary transceiver continues to receive and decrypt communications from the wireless nodes using the current encryption key. At step 58, the primary transceiver begins communicating with the wireless nodes using the new encryption key.

The data concentrator verifies successful key update of all wireless nodes. At step 60, it is determined if all wireless nodes have successfully updated their encryption keys. Verification may be accomplished by receiving a communication from each node through the primary transceiver. This communication may be an acknowledgement or any other communication. If the respective wireless node is communicating data that is encrypted using the new key, then that node has successfully updated its encryption key. This way, successful key encryption updates can be verified even if the acknowledgment from the wireless node was lost.

If all nodes have successfully updated their encryption keys, method 50 proceeds to step 62. If there are any nodes that have not successfully updated their encryption keys, method 50 proceeds to step 64. At step 64, the secondary transceiver re-sends the key update instruction encrypted with the current key to each of the nodes that have not successfully updated to the new key. Method 50 then returns to step 56. At step 62, the key update is complete for all wireless nodes. The secondary transceiver transitions to a support and monitoring function while the primary transceiver is used for all data communication with the wireless nodes.

Discussion of Possible Embodiments

The following are non-exclusive descriptions of possible embodiments of the present invention.

A method of wireless communication includes updating a first encryption key to a second encryption key; communicating, via a first transceiver, the second encryption key to a first wireless node; decrypting first data transmissions received from the first wireless node via the first transceiver using the first encryption key; and decrypting the first data transmissions received from the first wireless node via a second transceiver using the second encryption key.

The method of the preceding paragraph can optionally include, additionally and/or alternatively, any one or more of the following features, configurations and/or additional components:

A further embodiment of the foregoing method, further including verifying that the first wireless node updated to the second encryption key based upon successfully decrypting the first data transmissions from the first wireless node via the second transceiver using the second encryption key.

A further embodiment of any of the foregoing methods, further including updating the second encryption key to a third encryption key; communicating, via the second transceiver, the third encryption key to the first wireless node; decrypting second data transmissions received from the first wireless node via the second transceiver using the second encryption key; and decrypting the second data transmissions received from the first wireless node via the first transceiver using the third encryption key.

A further embodiment of any of the foregoing methods, further including updating the second encryption key to a third encryption key; communicating, via the first transceiver, the third encryption key to the first wireless node; decrypting second data transmissions received from the first wireless node via the first transceiver using the second encryption key; and decrypting the second data transmissions received from the first wireless node via the second transceiver using the third encryption key.

A further embodiment of any of the foregoing methods, further including communicating, via the first transceiver, the second encryption key to a plurality of second wireless nodes; decrypting third transmissions received from the plurality of second wireless nodes via the first transceiver using the first encryption key; and decrypting the third data transmissions received from the plurality of second wireless nodes via the second transceiver using the second encryption key.

A further embodiment of any of the foregoing methods, further including determining, by a data concentrator, that the first and all of the plurality of second wireless nodes successfully updated to the second encryption key; and decrypting fourth data transmissions received via the second transceiver using the second encryption key following determination that the first and all of the plurality of second wireless nodes successfully updated to the second encryption key.

A further embodiment of any of the foregoing methods, further including designating the first transceiver as a support and monitoring transceiver following determination that the first and all of the plurality of second wireless nodes successfully updated to the second encryption key.

A wireless communication system includes a first wireless node and a data concentrator configured to provide a new encryption key updated from a current encryption key to the first wireless node. The data concentrator includes first and second transceivers. The data concentrator provides a key update message that includes the new encryption key to the first wireless node via the first transceiver. The key update message is encrypted using the current encryption key. The data concentrator is configured to decrypt first transmissions from the first wireless node via the second transceiver using the new encryption key, and decrypt the first transmissions via the first transceiver using the current encryption key.

The wireless communication system of the preceding paragraph can optionally include, additionally and/or alternatively, any one or more of the following features, configurations and/or additional components:

A further embodiment of the foregoing wireless communication system, wherein the data concentrator is further configured to verify that the first wireless node successfully updated to the new encryption key by successfully decrypting the first transmissions using the new encryption key.

A further embodiment of any of the foregoing wireless communications system, wherein the data concentrator is further configured to determine that the first wireless node did not update to the new encryption key by successfully decrypting the first transmissions using the current encryption key.

A further embodiment of any of the foregoing wireless communications system, wherein the data concentrator is further configured to resend the key update message to the first wireless node via the first transceiver upon determination that the first wireless node did not update to the new encryption key.

A further embodiment of any of the foregoing wireless communications system, further including a plurality of second wireless nodes, wherein the data concentrator is further configured to provide the key update message to each of the plurality of second wireless nodes via the first transceiver.

A further embodiment of any of the foregoing wireless communications system, wherein the data concentrator is further configured to verify that the first and all of the plurality of second wireless nodes have successfully updated to the new key by successfully decrypting first transmissions from each of the first and the plurality of second wireless nodes using the new encryption key.

A further embodiment of any of the foregoing wireless communications system, wherein the first transceiver is used for support and monitoring purposes upon determination that the first and all of the plurality of second wireless nodes have updated to the new encryption key.

A method of wireless communication between a data concentrator and a plurality of wireless nodes includes encrypting a key update command using a current encryption key, wherein the key update command includes a new encryption key; transmitting, via a first transceiver, the key update command to the plurality of wireless nodes; decrypting, via the first transceiver, messages from the plurality of wireless nodes using the current encryption key; and decrypting, via a second transceiver, messages from the plurality of wireless nodes using the new encryption key.

The method of the preceding paragraph can optionally include, additionally and/or alternatively, any one or more of the following features, configurations and/or additional components:

A further embodiment of the foregoing method, further including verifying, for each of the plurality of wireless nodes, successful update to the new encryption key based upon successful decryption of the message using the new encryption key.

A further embodiment of any of the foregoing methods, further including determining, for each of the plurality of wireless nodes, if the key update was unsuccessful based upon successful decryption of the messages using the current encryption key; and re-transmitting, via the first transceiver, the key update command to each of the plurality of wireless nodes for which the key update was unsuccessful.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of wireless communication, the method comprising:
Updating, at a data concentrator, a first encryption key to a second encryption key to encrypt communication between the data concentrator and a plurality of wireless nodes, wherein the data concentrator comprises a first transceiver and a second transceiver;
encrypting the second encryption key using the first encryption key;
communicating, via the first transceiver, the second encryption key to each of the plurality of wireless nodes;
decrypting, by each of the plurality of wireless nodes, the encrypted second encryption key using the first encryption key;
updating, at each of the plurality of wireless nodes, the first encryption key to the second encryption key;
decrypting first data transmissions received from each of the plurality of wireless nodes via the first transceiver using the first encryption key;
decrypting the first data transmissions received from each of the plurality of wireless nodes via the second transceiver using the second encryption key;
wherein, if the second transceiver successfully decrypts the first data transmissions from all of the plurality of wireless nodes using the second encryption key the data concentrator verifies that all of the plurality of wireless nodes have successfully updated from the first encryption key to the second encryption key and if the second transceiver does not successfully decrypt the first data transmissions from all of the plurality of wireless nodes using the second encryption key the first transceiver re-sends the second encryption key to each of the plurality of wireless nodes for which the second transceiver did not successfully decrypt the first data transmissions using the second encryption key.

2. The method of claim 1, further comprising:
updating the second encryption key to a third encryption key;
communicating, via the second transceiver, the third encryption key to the plurality of wireless nodes;
decrypting second data transmissions received from the plurality of wireless nodes via the second transceiver using the second encryption key; and
decrypting the second data transmissions received from the plurality of wireless nodes via the first transceiver using the third encryption key.

3. The method of claim 1, further comprising:
updating the second encryption key to a third encryption key;
communicating, via the first transceiver, the third encryption key to the plurality of wireless nodes;
decrypting second data transmissions received from the plurality of wireless nodes via the first transceiver using the second encryption key; and
decrypting the second data transmissions received from the plurality of wireless nodes via the second transceiver using the third encryption key.

4. The method of claim 1, further comprising:
designating the first transceiver as a support and monitoring transceiver following determination that all of the plurality of wireless nodes successfully updated to the second encryption key.

5. The method of claim 1, wherein the first transceiver continues to re-send the second encryption key to each of the plurality of wireless nodes for which the second transceiver did not successfully decrypt the first data transmissions using the second encryption key until the data concentrator verifies that all of the plurality of wireless nodes have successfully updated from the first encryption key to the second encryption key.

6. A wireless communication system comprising:
a plurality of wireless nodes; and
a data concentrator configured to provide a new encryption key updated from a current encryption key to the plurality of wireless nodes, the data concentrator comprising:
a first transceiver, wherein the data concentrator provides a key update message that includes the new encryption key to the plurality of wireless nodes via the first transceiver, and wherein the key update message is encrypted using the current encryption key; and a second transceiver, wherein the data concentrator is further configured to decrypt first transmissions from the plurality of wireless nodes via the second transceiver using the new encryption key, and decrypt the first transmissions from the plurality of wireless nodes via the first transceiver using the current encryption key; and the data concentrator is further configured to verify that all of the plurality of wireless nots have successfully updated from the current encryption key to the new encryption key if the second transceiver successfully decrypts the first data transmissions from all of the plurality of wireless nodes using the new encryption key the data concentrator; and the data concentrator is further configured to cause the first transceiver to re-send the key update message to each of the plurality of wireless nodes for which the second transceiver did not successfully decrypt the first transmissions using the new encryption key if the second transceiver does not successfully decrypt the first data transmissions from all of the plurality of wireless nodes using the new encryption key.

7. The system of claim 6, wherein the data concentrator is further configured to continue re-sending the key update message to each of the plurality of wireless nodes for which the second transceiver did not successfully decrypt the messages using the new encryption key via the first transceiver until the data concentrator verifies that all of the plurality of wireless nodes have successfully updated to the new encryption key.

8. The system of claim 6, wherein the first transceiver is used for support and monitoring purposes upon determination that the plurality of wireless nodes have updated to the new encryption key.

9. A method of wireless communication between a data concentrator and a plurality of wireless nodes, the method comprising:

encrypting a key update command using a current encryption key, wherein the key update command includes a new encryption key;

transmitting, via a first transceiver of the data concentrator, the key update command to the plurality of wireless nodes;

decrypting, by each of the plurality of wireless nodes, the key update command using the first encryption key;

updating, by each of the plurality of wireless nodes, the first encryption key to the new encryption key after executing the key update command;

decrypting, via the first transceiver, messages from the plurality of wireless nodes using the current encryption key; and decrypting, via a second transceiver of the data concentrator, messages from the plurality of wireless nodes using the new encryption key;

wherein, if the second transceiver successfully decrypts the messages from all of the plurality of wireless nodes using the new encryption key, the data concentrator verifies that all of the plurality of wireless nodes have successfully updated from the current encryption key to the new encryption key and if the second transceiver does not successfully decrypt the messages from all of the plurality of wireless nodes using the new encryption key the first transceiver re-sends the key update command to each of the plurality of wireless nodes for which the second transceiver did not successfully decrypt the messages using the new encryption key.

10. The method of claim 9, wherein the first transceiver continues to re-send the key update command to each of the plurality of wireless nodes for which the second transceiver did not successfully decrypt the messages using the new encryption key until the data concentrator verifies that all of the plurality of wireless nodes have successfully updated from the current encryption key to the new encryption key.

* * * * *